United States Patent
Nodera

(10) Patent No.: US 6,348,527 B1
(45) Date of Patent: *Feb. 19, 2002

(54) THERMOPLASTIC RESIN COMPOSITION BASED ON A COMBINATION OF POLYCARBONATE AND STYRENIC RESINS

(75) Inventor: Akio Nodera, Ichihara (JP)

(73) Assignee: Idemitsu Petrochemical Co., Ltd., Tokyo (JP)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/358,419

(22) Filed: Jul. 22, 1999

(30) Foreign Application Priority Data

Aug. 13, 1998 (JP) .......................... 10-228856

(51) Int. Cl.[7] .......................... C08K 5/103; C08L 69/00
(52) U.S. Cl. .................. 524/127; 524/140; 524/311; 524/487
(58) Field of Search .................. 524/311, 127, 524/140, 487

(56) References Cited

U.S. PATENT DOCUMENTS

| | | | |
|---|---|---|---|
| 4,988,748 A | * | 1/1991 | Fuhr |
| 5,055,508 A | * | 10/1991 | Ohtsubo |
| 5,244,954 A | * | 9/1993 | Fasulo |
| 5,602,201 A | * | 2/1997 | Fujiguchi |
| 5,717,057 A | * | 2/1998 | Sakashita |
| 5,723,526 A | * | 3/1998 | Nagasawa |
| 5,731,389 A | * | 3/1998 | Bailly |
| 5,837,757 A | | 11/1998 | Nodera et al. |

FOREIGN PATENT DOCUMENTS

| | | |
|---|---|---|
| DE | 40 16 417 | 11/1991 |
| DE | 43 09 142 | 9/1994 |
| EP | 0 351 648 | 1/1990 |
| EP | 0 364 729 | 4/1990 |
| EP | 0 432 581 | 6/1991 |
| EP | 0 437 707 | 7/1991 |
| EP | 0 492 550 | 7/1992 |
| EP | 0 849 327 | 6/1998 |
| WO | 9322382 | * 11/1993 |
| WO | wo 96/06135 | 2/1996 |
| WO | WO 99/16828 | 4/1999 |

OTHER PUBLICATIONS

Chemical Abstracts, vol. 113, No. 12, Sep. 17, 1990, JP 02 038449, Feb. 7, 1990.

* cited by examiner

*Primary Examiner*—David J. Buttner
(74) *Attorney, Agent, or Firm*—Oblon, Spivak, McClelland, Maier & Neustadt, P.C.

(57) ABSTRACT

Provided are a thermoplastic resin composition comprising a polycarbonate resin, and its injection moldings. The composition has good moldability, and its injection moldings have the advantages of high impact resistance, good mechanical strength, and good mold releasability. The composition is well moldable into thin-walled and complicated moldings through injection molding, and the productivity of the moldings is high. The composition comprises 100 parts by weight of a resin mixture of (A) from 30 to 99% by weight of a polycarbonate resin and (B) from 1 to 70% by weight of a styrenic resin, and from 0.1 to 5 parts by weight of (C) an ester of pentaerythritol and a saturated aliphatic carboxylic acid. The composition preferably contains a flame retardant, especially a halogen-free phosphate, still having good moldability, and its injection moldings have the advantages of safety, flame retardancy, high impact resistance and good mechanical strength.

11 Claims, No Drawings

THERMOPLASTIC RESIN COMPOSITION BASED ON A COMBINATION OF POLYCARBONATE AND STYRENIC RESINS

BACKGROUND OF THE INVENTION

1. Field of the Invention

The present invention relates to a thermoplastic resin composition and its injection moldings, more precisely, to a thermoplastic resin composition having good melt fluidity and its injection moldings having good mold releasability and physical properties.

2. Description of the Related Art

As having the advantages of impact resistance, heat resistance and good electric properties, polycarbonate resins have many applications in various fields of, for example, office automation appliances, electric and electronic appliances, car parts and building materials. However, there are some problems with polycarbonate resins in that they require high molding and working temperatures and their melt fluidity is low. Like ordinary thermoplastic resins, polycarbonate resins are molded into various moldings through injection molding. Where they are molded into parts or housings of office automation appliances such as duplicators or facsimiles or those of electric and electronic appliances, the moldings shall have a complicated shape with local projections or depressions, for example, having ribs or bosses therewith. Those moldings of polycarbonate resins are often difficult to release from molds, and their smooth release from molds is often impossible. As the case may be, the moldings will be gapped in holes. Even though released from molds, the moldings will be often deformed, whitened or distorted with residual strain. For these reasons, polycarbonate resin moldings are often problematic in that they could not ensure good dimension accuracy, strength and appearance.

As a rule, polycarbonate resins are self-extinguishable. However, some of their applications to office automation appliances, electric and electronic appliances and others require high-level flame retardancy. To meet the requirement, various flame retardants are added to polycarbonate resins. On the other hand, compositions of polycarbonate resins to which are added styrene resins such as acrylonitrile-butadiene-styrene resins (ABS resins), acrylonitrile-styrene resins (AS resins) and the like are known as polymer alloys, and have many applications in the field of moldings as having good heat resistance and impact resistance. Of their applications, where such polycarbonate resin compositions are used for electric and electronic appliances and car parts, they are required to have high flame retardancy of not lower than a predetermined level so as to ensure and increase the safety of their moldings, especially electric and electronic appliances for household use and office automation appliances.

To meet the requirements as above, various methods have heretofore been proposed. Concretely, JP-A 61-55145 discloses a thermoplastic resin composition comprising (A) an aromatic polycarbonate resin, (B) an ABS resin, (C) an AS resin, (D) a halogen compound, (E) a phosphate, and (F) a polytetrafluoroethylene component. JP-A 2-32154 discloses a molding polycarbonate composition with high flame retardancy and high impact resistance, comprising (A) an aromatic polycarbonate resin, (B) an ABS resin, (C) an AS resin, (D) a phosphate, and (E) a polytetrafluoroethylene component. JP-A 8-239565 discloses a polycarbonate resin composition comprising (A) an aromatic polycarbonate, (B) an impact-resistant polystyrene resin with rubber-like elasticity, (C) a halogen-free phosphate, (D) a core/shell-type grafted rubber-like elastomer, and (E) talc.

These are all to improve the melt fluidity and therefore the moldability of polycarbonates, and to improve the impact resistance and the flame retardancy of the moldings of polycarbonates. As having such improved properties, the polycarbonate compositions proposed are formed into various practicable moldings. However, in special fields of office automation appliances, electric and electronic appliances especially those for household use, etc., parts and housings of those appliances are required to be more lightweight and thin. In particular, their shape is being more complicated to have fine projections and depressions such as ribs and bosses therewith or have a lattice structure, so that they are applicable to any complicated and large-sized appliances. To the moldings of the parts and housings for the appliances, especially to those to be formed in injection moldings, good releasability from molds is important. However, in order to ensure good releasability from molds of the moldings, thinning their walls and designing them is naturally limited. Therefore, some solutions to the limitation are desired.

In order to improve the mold releasability of polycarbonate resins, mold lubricants are often added to them. For example, JP-B 61-41939 discloses a molding composition containing a specific ester of an alcohol and an acid. They say therein that the moldings of the composition are degraded and yellowed little. To support the mold releasability of the composition, they did a test, in which the moldings not containing the mold release agent of a specific ester were broken by the ejector pin, and the pressure to the ejector pin was shown in terms of psi for the moldings containing the mold release agent. However, the difference in the data shown therein between Examples containing the specific ester and Comparative Examples not containing it is small. In addition, in this patent publication, any concrete disclosure is not shown relating to a technical idea of adding styrene resins to polycarbonate resins and to the flame retardancy of polycarbonate resin compositions.

JP-A 8-48844 discloses a flame-retardant resin composition with good mold releasability, which comprises (A) a polycarbonate, (B) a styrenic resin, (C) a resorcinol polyphosphate compound and (D) polytetrafluoroethylene, and contains (E) from 0.1 to 2 parts by weight, relative to 100 parts by weight of the resin composition, of a saturated fatty acid ester wax having a mean molecular weight of from 1000 to 50000, and (F) from 0.01 to 2 parts by weight, relative to the same, of a polyethylene wax having a mean molecular weight of from 1000 to 3000. Obviously, they say therein that the two waxes are effective only a little or are not effective at all when separately added to the resin composition, but could exhibit a significant mold-releasability improving effect only when added both together.

SUMMARY OF THE INVENTION

In that situation, the object of the present invention is to provide an improved thermoplastic resin composition comprising a polycarbonate resin and also its injection moldings well applicable even to thin-walled and complicated office automation appliances, electric and electronic appliances and car parts. The composition has good moldability, and its moldings have good impact resistance and high mechanical strength, especially having good flame retardancy. In particular, the moldings of the composition are easy to release from molds, even though being thin-walled and complicated in shape, and the freeness in designing products of the moldings is significant.

To attain the object as above, I, the present inventor have assiduously studied various thermoplastic resin compositions comprising a polycarbonate resin, with varying the ratio of the polycarbonate resin to various thermoplastic resins therein, not only for their moldability and physical properties but also for their mold releasability relative to different types of mold release agent to be combined with them. As a result, I have found that, when a specific additive is added to a thermoplastic resin composition comprising a polycarbonate resin and a styrene resin, then the resulting resin composition can be well produced and molded into good moldings. In particular, I have found that the resin composition has good melt fluidity and can be surely and stably molded into thin-walled, complicated and even relatively large-sized moldings, that the moldings can be surely released from molds, and that the moldings have high impact strength. On the basis of these findings, I have completed the present invention.

Specifically, the invention provides the following:

(1) A thermoplastic resin composition comprising 100 parts by weight of a resin mixture of (A) from 30 to 99% by weight of a polycarbonate resin and (B) from 1 to 70% by weight of a styrenic resin, and from 0.1 to 5 parts by weight of (C) an ester of pentaerythritol and a saturated aliphatic carboxylic acid.

(2) The thermoplastic resin composition of (1), which further contains from 0.1 to 5 parts by weight, relative to 100 parts by weight of the resin mixture, of (D) a polyolefin wax.

(3) The thermoplastic resin composition of (1) or (2), which further contains from 1 to 30 parts by weight, relative to 100 parts by weight of the resin mixture, of (E) a rubber-like elastomer.

(4) The thermoplastic resin composition of any one of (1) to (3), which further contains from 1 to 50 parts by weight, relative to 100 parts by weight of the resin mixture, of (F) a flame retardant.

(5) The thermoplastic resin composition of (4), wherein the flame retardant is a halogen-free phosphate.

(6) The thermoplastic resin composition of (4) or (5), which further contains from 0.05 to 5. parts by weight, relative to 100 parts by weight of the resin mixture, of (G) a fluoro-olefinic resin.

(7) The thermoplastic resin composition of (6), wherein the fluoro-olefinic resin has the ability to form fibrils.

(8) The thermoplastic resin composition of any one of (1) to (7), which further contains from 1 to 50parts by weight, relative to 100 parts by weight of the resin mixture, of (H) an inorganic filler.

(9) An injection molding of the thermoplastic resin composition of any one of (1) to (8).

(10) The injection molding of (9), which is for housings or parts of office automation appliances, or for those of electric and electronic appliances for household use or industrial use.

DETAILED DESCRIPTION OF THE INVENTION

The invention is described in detail hereinunder. First mentioned are the components (A) to (C) constituting the thermoplastic resin composition of the invention.

(A) Polycarbonate Resin (PC):

The polycarbonate resin serving as the component (A) in the resin composition is not specifically defined, and may be any and every one known in the art. Generally used are aromatic polycarbonates to be produced from diphenols and carbonate precursors. For example, used are polycarbonates as produced by reacting a diphenol and a polycarbonate precursor in a solution method or in a melt method, such as or through interesterification of a diphenol and a diphenyl carbonate.

Various diphenols are usable, including, for example, 2,2-bis(4-hydroxyphenyl)propane [bisphenol A], bis(4-hydroxyphenyl)methane, 1,1-bis(4-hydroxyphenyl)ethane, 2,2-bis(4-hydroxy-3,5-dimethylphenyl)propane, 4,4,'-dihydroxydiphenyl, bis(4-hydroxyphenyl)cycloalkanes, bis(4-hydroxyphenyl) oxide, bis(4-hydroxyphenyl) sulfide, bis(4-hydroxyphenyl) sulfone, bis (4-hydroxyphenyl) sulfoxide, bis(4-hydroxyphenyl) ether, bis(4-hydroxyphenyl) ketone, etc.

As the diphenols for use herein, preferred are bis(hydroxyphenyl)alkanes, especially bisphenol A. The carbonate precursors for use in the invention include, for example, carbonyl halides, carbonyl esters, haloformates, concretely, phosgene, diphenol dihaloformates, diphenyl carbonate, dimethyl carbonate, diethyl carbonate, etc. Other diphenols such as hydroquinone, resorcinol, catechol and the like are also usable in the invention. The diphenols mentioned herein may be used either singly or as combined.

The polycarbonate resin may have a branched structure, for which the branching agent includes 1,1,1-tris(4-hydroxyphenyl)ethane, α,α',α"-tris(4-hyroxyphenyl)-1,3,5-triisopropylbenzene, phloroglucine, trimellitic acid, isatin-bis(o-cresol), etc. For controlling the molecular weight of the polycarbonate resin, employable are phenol, p-t-butylphenol, p-t-octylphenol, p-cumylphenol, etc.

The polycarbonate resin for use in the invention may be a copolymer having a polycarbonate moiety and a polyorganosiloxane moiety, or it may have a moiety of the copolymer. The copolymer may be a polyester-polycarbonate resin to be produced through polymerization of a polycarbonate in the presence of an ester precursor, such as a difunctional carboxylic acid (e.g., terephthalic acid) or its ester-forming derivative. Various types of different polycarbonate resins may be mixed to give mixed polycarbonate resins for use in the invention.

In view of its mechanical strength and moldability, the polycarbonate resin to be the component (A) in the invention preferably has a viscosity-average molecular weight of from 10,000 to 100,000, more preferably from 14,000 to 40,000.

(B) Styrenic Resin:

The styrenic resin to be the component (B) in the thermoplastic resin composition of the invention may be a polymer as prepared through polymerization of a monomer or monomer mixture of from 20 to 100% by weight of a monovinylic aromatic monomer such as styrene, α-methylstyrene or the like, from 0 to 60% by weight of a vinyl cyanide-type monomer such as acrylonitrile, methacrylonitrile or the like, and from 0 to 50% by weight of any other vinylic monomer copolymerizable with those monomers, such as maleimide, methyl (meth)acrylate or the like. The polymer includes, for example, polystyrenes (GPPS), acrylonitrile-styrene copolymers (AS resins), etc.

As the styrenic resin, also preferably used herein are rubber-like polymer-modified styrenic resins. The modified styrenic resins are preferably impact-resistant styrenic resins as produced through grafting polymerization of rubber-like polymers with styrenic monomers. The rubber-modified styrenic resins include, for example, impact-resistant polystyrenes (HIPS) as produced through additional polymerization of rubber-like polymers such as polybutadiene or the like with styrene; ABS resins as produced through additional polymerization of polybutadiene with acrylonitrile and styrene; MBS resins as produced through additional polymerization of polybutadiene with methyl methacrylate and styrene, etc. These rubber-modified styrenic resins may be combined, or may be mixed with other styrenic resins not modified with rubber such as those mentioned above, and the resin mixtures may be used in the invention.

In the rubber-modified styrenic resins, the amount of the rubber-like polymer to modify them may fall, for example, between 2 and 50% by weight, but preferably between 5 and 30% by weight. If the amount of the modifying rubber-like polymer is smaller than 2% by weight, the resin composition will have poor impact resistance. If, on the other hand, it is larger than 50% by weight, the thermal stability of the resin composition will be lowered, and the melt fluidity thereof will be also lowered. If so, the resin composition will be unfavorably gelled or yellowed. Specific examples of the rubber-like polymer include polybutadiene, acrylate and/or methacrylate-having rubber-like polymers, styrene-butadiene-styrene (SBS) rubber, styrene-butadiene rubber (SBR), butadiene-acrylic rubber, isoprene rubber, isoprene-styrene rubber, isoprene-acrylic rubber, ethylene-propylene rubber, etc.

Of those, especially preferred is polybutadiene. The polybutadiene usable herein may be any of low-cis polybutadiene (for example, having from 1 to 30 mol % of 1,2-vinyl bonds and from 30 to 42 mol % of 1,4-cis bonds) or high-cis polybutadiene (for example, having at most 20 mol % of 1,2-vinyl bonds and at least 78 mol % of 1,4-cis bonds), and even their mixtures.

(C) Ester of Pentaerythritol and Saturated Aliphatic Carboxylic Acid:

The ester to be the component (C) in the thermoplastic resin composition of the invention is a reaction product of pentaerythritol and a saturated aliphatic monocarboxylic acid, which may be prepared through any known esterification of the two. The carboxylic acid is preferably a monocarboxylic acid having from 5 to 34 carbon atoms or so, but preferably from 14 to 26 carbon atoms or so. Concretely, it includes caproic acid, caprylic acid, lauric acid, palmitic acid, stearic acid, behenic acid, adipic acid, sebacic acid, etc. Of the esters, preferred is pentaerythritol tetrastearate.

The thermoplastic resin composition of the invention basically comprises 100 parts by weight of a resin mixture of (A) from 30 to 99% by weight, preferably from 50 to 95% by weight of a polycarbonate resin and (B) from 1 to 70% by weight, preferably from 5 to 50% by weight of a styrenic resin, and from 0.1 to 5 parts by weight, preferably from 0.2 to 3 parts by weight of (C) an ester of pentaerythritol and a saturated aliphatic carboxylic acid. If the proportion of the component (A), polycarbonate resin is smaller than 30% by weight in the resin mixture, the heat resistance and the mechanical strength of the composition will be poor. If, on the other hand, it is larger than 99% by weight, the melt fluidity of the composition could not be improved and the moldability of the composition will be poor. If the amount of the ester of pentaerythritol and a saturated aliphatic carboxylic acid to be in the composition is smaller than 0.1 parts by weight, the ester serving as a mold release agent will be ineffective and the mold releasability of the moldings of the composition will be poor. On the other hand, even if the amount of the ester is larger than 5 parts by weight, the mold releasability of the moldings could not be improved any more, and adding such a large amount of the ester is meaningless.

Basically and indispensably comprising the three components (A), (B) and (C), the thermoplastic resin composition of the invention could have good mold releasability. The composition may further contain some optional components such as those mentioned below, depending on the necessary properties of its moldings.

(D) Polyolefin Wax:

Polyolefin wax usable herein includes low-density, middle-density or high-density polyethylene wax, polypropylene wax, etc. The polyethylene wax preferably has a molecular weight of from 1000 to 5000 or so, and a melting point falling between 100 and 120° C. The polypropylene wax preferably has a molecular weight of from 15000 to 40000 or so. Of those, preferred is polyethylene wax. The amount of polyolefin wax, if any, in the composition of the invention may fall between 0.01 and 5 parts by weight, but preferably between 0.02 and 2 parts by weight, relative to 100 parts by weight of the resin mixture of the components (A) and (B). When combined with the component (C), ester of pentaerythritol and a saturated aliphatic carboxylic acid, polyolefin wax further improves the mold releasability of the moldings of the composition.

(E) Rubber-like Elastomer:

The component (E), rubber-like elastomer may be added to the thermoplastic resin composition of the invention so as to further improve the impact resistance of the moldings of the composition. Its amount may fall between 1 and 30 parts by weight, but preferably between 2 and 15 parts by weight, relative to 100 parts by weight of the resin mixture of the components (A) and (B). The amount of the rubber-like elastomer to be in the composition shall be determined, depending on the total properties (e.g., impact resistance, heat resistance, rigidity) of the intended moldings. The rubber-like elastomer includes, for example, polybutadiene, polyisoprene, styrene-butadiene-styrene (SBS) rubber, styrene-butadiene rubber (SBR), butadiene-acrylic rubber, isoprene-styrene rubber, isoprene-acrylic rubber, ethylene-propylene rubber, ethylene-propylene-diene rubber, etc. Of those, preferred are powdery or granular rubber-like elastomers having a two-layered core/shell structure in which the core is of a flexible rubber material and the shell that covers the core is of a rigid resin material. After blended with a polycarbonate melt, the rubber-like elastomers of that type mostly keep their original granular condition. Since the rubber-like elastomer keeps its original granular condition after having been blended with a polycarbonate melt, it is effective for preventing the moldings of the resin composition from being troubled by surface layer peeling.

Known are various core/shell-type, grafted rubber-like elastomers that are usable herein. Commercially-available products of such elastomers include, for example, Hiblen B621 (from Nippon Zeon), KM-330 (form Rohm & Haas), Metablen W529, Metablen S2001, Metablen C223, Metablen B621 (all from Mitsubishi Rayon), etc.

Above all, preferred are those to be produced through polymerization of one or more vinylic monomers in the presence of a rubber-like polymer as obtained from monomers of essentially alkyl acrylates or alkyl methacrylates and dimethylsiloxane. In the alkyl acrylates and methacrylates, the alkyl group preferably has from 2 to 10 carbon atoms. Concretely, the alkyl acrylates and methacrylates include, for example, ethyl acrylate, butyl acrylate, 2-ethylhexyl acrylate, n-octyl methacrylate, etc. One example of the rubber-like elastomers as obtained from monomers of essentially those alkyl acrylates is a polymer to be prepared through reaction of at least 70% by weight of the alkyl acrylates with at most 30% by weight of other copolymerizable vinylic monomers such as methyl methacrylate, acrylonitrile, vinyl acetate, styrene and the like. To prepare the polymer, a polyfunctional monomer serving as a crosslinking agent, such as divinylbenzene, ethylene dimethacrylate, triallyl cyanurate, triallyl isocyanurate or the like, may be added to the polymerization system.

The vinylic monomers to be polymerized in the presence of a rubber-like polymer include, for example, aromatic vinyl compounds such as styrene, α-methylstyrene, etc.; acrylates such as methyl acrylate, ethyl acrylate, etc.; methacrylates such as methyl methacrylate, ethyl methacrylate, etc. One or more these monomers may be (co)polymerized, as combined, or may be copolymerized with any other vinylic monomers such as vinyl cyanide compounds (e.g., acrylonitrile, methacrylonitrile), vinyl esters (e.g., vinyl acetate, vinyl propionate), etc. The (co)polymerization may be effected in any known method of, for example, bulk polymerization, suspension polymerization, emulsion polymerization or the like. Preferred is emulsion polymerization.

It is desirable that the core/shell-type, grafted rubber-like elastomers thus produced in the manner mentioned above contain at least 20% by weight of the rubber-like polymer moiety. Typical examples of the core/shell-type, grafted rubber-like elastomers are MAS resin elastomers such as graft copolymers of styrene and methyl methacrylate with from 60 to 80% by weight of n-butyl acrylate. Other examples are composite rubber grafted copolymers to be prepared through graft copolymerization of a composite rubber with at least one vinylic monomer, in which the composite rubber comprises from 5 to 95% by weight of a polysiloxane component and from 5 to 95% by weight of a polyacryl (meth) acrylate rubber component as so entangled that they are not separated from each other, and has a mean grain size of from 0.01 to 1 μm or so. The composite rubber grafted copolymers are better than single rubber grafted copolymers, as their effect of improving the impact resistance of resin moldings is higher than that of the latter, single rubber grafted copolymers. Commercial products of such composite rubber grafted copolymers are available, for example, Metablen S-2001 from Mitsubishi Rayon.

(F) Flame Retardant:

Where the moldings of the invention are for office automation appliances, electric and electronic appliances and the like, they shall be resistant to flames. For these, various flame retardants may be added to the moldings. Examples of flame retardants include organic phosphorus compounds, halogen-free phosphorus compounds, halogen compounds, nitrogen compounds, metal hydroxides, red phosphorus, antimony compounds, etc. The halogen compounds include, for example, tetrabromobisphenol A, halogenopolycarbonates, copolymerized oligomers of halogenopolycarbonates, decabromodiphenyl ether, halogenopolystyrenes, halogenopolyolefins, etc. The nitrogen compounds include, for example, melamine, alkyl group or aromatic group-substituted melamines, etc.; the metal hydroxides include, for example, magnesium hydroxide, aluminium hydroxide, etc.; the antimony compounds include, for example, antimony trioxide, antimony tetroxide, etc.

However, halogen-containing flame retardants are unfavorable, as often discharging harmful substances when moldings comprising them are incinerated. Therefore, preferred are halogen-free, organic phosphorus-containing flame retardants. Any organic compounds containing phosphorus but not containing halogen are employable herein with no limitation, so far as they serve as flame retardants. As the flame retardants for use herein, however, preferred are phosphate compounds having at least one esteric oxygen atom directly bonding to a phosphorus atom. For example, preferred are phosphate compounds of the following formula (1):

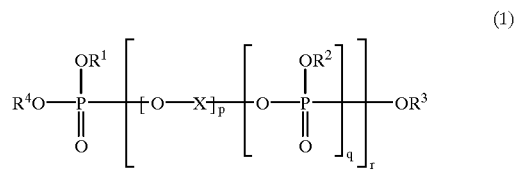

wherein $R^1$, $R^2$, $R^3$ and $R^4$ each independently represent a hydrogen atom or an organic group; X represents a divalent or higher polyvalent organic group; p is 0 or 1; q is an integer of 1 or larger; and r is an integer of 0 or larger.

In formula (I), the organic group includes, for example, substituted or unsubstituted alkyl, cycloalkyl and aryl groups, etc. The substituents for the substituted groups include, for example, alkyl groups, alkoxy groups, aryl groups, aryloxy groups, arylthio groups, etc. These substituents may be combined to give arylalkoxyalkyl groups, or may be bonded, for example, via oxygen, nitrogen or sulfur atom to give arylsulfonylaryl groups.

In formula (I), the divalent or higher polyvalent organic group X is meant to include divalent or higher polyvalent groups to be derived from the organic groups as above by removing one or more hydrogen atoms bonding to carbon atoms. For example, it includes alkylene groups, (substituted) phenylene groups, groups as derived from bisphenols of polycyclic phenols. Preferred are groups derived from bisphenol A, hydroquinone, resorcinol, diphenylolmethane, dihydroxydiphenyl, dihydroxynaphthalene, etc.

The halogen-free phosphate compounds may be monomers, oligomers, polymers or their mixtures. Concretely, they include, for example, trimethylphosphate, triethylphosphate, tributyl phosphate, trioctyl phosphate, tributoxyethyl phosphate, triphenyl phosphate, tricresyl phosphate, cresyldiphenyl phosphate, octyldiphenyl phosphate, tri(2-ethylhexyl) phosphate, diisopropylphenyl phosphate, trixylenyl phosphate, tris(isopropylphenyl) phosphate, trinaphthyl phosphate, bisphenol A bisphosphate, hydroquinone bisphosphate, resorcinol bisphosphate, resorcinol-diphenyl phosphate, trihydroxybenzene triphsophate, cresyldiphenyl phosphate, etc.

Commercially-available, halogen-free phosphates that are preferably used as the component (F) to be in the thermoplastic resin composition of the invention are, for example, TPP [triphenyl phosphate], TXP [trixylenyl phosphate], PFR [resorcinol(diphenyl phosphate)], PX200 [1,3-phenylene-tetrakis(2,6-dimethylphenyl) phosphate], PX201 [1,4-phenylene-tetrakis(2,6-dimethylphenyl) phosphate], PX202 [4,4'-biphenylene-tetrakis(2,6-dimethylphenyl) phosphate], CR733S [phenylresorcinol polyphosphate], all from Daihachi Chemical Industry.

The amount of the flame retardant to be in the composition may fall between 1 and 50 parts by weight, but preferably between 2 and 30 parts by weight, more preferably between 3 and 15 parts by weight, relative to 100 parts by weight of the resin mixture of (A) and (B). If the flame retardant content of the composition is smaller than 2 parts by weight, the composition could hardly have the intended flame retardancy. If, on the other hand, it is larger than 50 parts by weight, the heat resistance and the impact strength of the composition will be lowered. Therefore, the flame retardant content of the composition shall be comprehensively determined, depending on the necessary properties of the moldings of the composition and on the amount of the other constituent components of rubber-like elastomer, inorganic filler, etc.

(G) Fluoro-olefinic Resin:

The optional component (G), fluoro-olefinic resin that may be in the thermoplastic resin composition of the invention exhibits a resin melt-dropping preventing effect when the composition is fired. The fluoro-olefinic resin is a polymer having a fluoro-olefinic structure, for example, including difluoroethylene polymers, tetrafluoroethylene polymers, tetrafluoroethylene-hexafluoropropylene copolymers, and copolymers of tetrafluoroethylene with fluorine-free ethylenic monomers. Preferred is polytetrafluoroethylene (PTFE) desirably having a mean molecular weight of at least 500,000, more desirably from 500,000 to 10,000,000. All types of polytetrafluoroethylene known in the art are usable herein.

More preferred is polytetrafluoroethylene having the ability to form fibrils, as its property of preventing resin melts from dropping is better. The fibril-forming polytetrafluoroethylene (PTFE) is not specifically defined, but preferred is PTFE of Type 3 stipulated in the ASTM Standard. Specific examples of PTFE of Type 3 include Teflon 6-J (from Mitsui-DuPont Fluorochemical), Polyflon D-1, Polyflon F-103, Polyflon F201L (all from Daikin Industry), CD-076 (from Asahi ICI Fluoropolymers), etc.

Others except PTFE of Type 3 are also employable herein, including, for example, Argoflon F5 (from Montefluos), Polyflon MPA, FA-100 (both from Daikin Industry), etc. These polytetrafluoroethylenes (PTFEs) may be used either singly or as combined. The fibril-forming polytetrafluoroethylenes (PTFEs) as above may be obtained, for example, by polymerizing tetrafluoroethylene in an aqueous solvent in the presence of sodium, potassium or ammonium peroxydisulfide, under a pressure of from 1 to 100 psi, at a temperature falling between 0 and 200° C., preferably between 20 and 100° C.

The fluoro-olefinic resin content of the composition may fall between 0.05 and 5 parts by weight, but preferably between 0.1 and 2 parts by weight relative to 100 parts by weight of the resin mixture of (A) and (B). If the fluoro-olefinic resin content is smaller than 0.05 parts by weight, the resin melt-dropping preventing ability of the composition will be not enough for the intended flame retardancy of the composition. However, even if the content is larger than 5 parts by weight, the effect of the fluoro-olefinic resin added could not be augmented any more, and such a large amount of the fluoro-olefinic resin, if added to the composition, will have some negative influences on the impact resistance and the outward appearance of the moldings of the composition. Therefore, the amount of the fluoro-olefinic resin to be added to the composition may be suitably determined, depending on the necessary flame retardancy of the moldings of the composition, for example, based on V-0, V-1 or V-2 in UL-94, and depending on the amount of the other constituent components.

(H) Inorganic Filler:

The optional component (H), inorganic filler that may be in the thermoplastic resin composition of the invention is to further increase the rigidity and the flame retardancy of the moldings of the composition. The inorganic filler includes, for example, talc, mica, kaolin, diatomaceous earth, calcium carbonate, calcium sulfate, barium sulfate, glass fibers, carbon fibers, potassium titanate fibers, etc. Of those, preferred are tabular fillers of talc, mica, etc., and fibrous fillers. Talc is a hydrous silicate of magnesium, and any commercially available products of it are employable herein. Talc may contain a minor amount of aluminium oxide, calcium oxide and iron oxide, in addition to the essential components of silicic acid and magnesium oxide. In producing the resin composition of the invention, any talc even containing such minor components is employable. The inorganic filler such as talc for use in the invention generally has a mean grain size of from 0.1 to 50 $\mu$m, but preferably from 0.2 to 20 $\mu$m. Containing the inorganic filler as above, especially talc, the rigidity of the moldings of the invention is further increased and, in addition, the amount of the flame retardant, halogen-free phosphate to be in the composition could be reduced.

The amount of the component (H), inorganic filler that may be in the composition of the invention may fall between 1 to 50 parts by weight, but preferably between 2 and 30 parts by weight, relative to 100 parts by weight of the resin mixture of (A) and (B). If its amount is smaller than 1 part by weight, the inorganic filler added could not satisfactorily exhibit its effect of improving the rigidity and the flame retardancy of the moldings of the composition. However, if the amount is larger than 50 parts by weight, the impact resistance of the moldings will lower and the melt fluidity of the composition will lower. The amount of the inorganic filler to be in the composition shall be suitably determined, depending on the necessary properties of the moldings and the moldability of the composition, especially on the thickness of the moldings and the spiral flow length of the composition.

Apart from the essential components (A) to (C) and at least one optional component selected from (D) to (H), the thermoplastic resin composition of the invention may further contain any other additives which are generally added to ordinary thermoplastic resins, if desired. The additives are for further improving the outward appearance, the static electrification resistance, the weather resistance and the rigidity of the moldings of the composition. For example, the additives include antistatic agents, polyamide-polyether block copolymers (for permanent static electrification resistance), benzotriazole-type or benzophenone-type UV absorbents, hindered amine-type light stabilizers (weather-proofing agents), microbicides, compatibilizers, colorants (dyes, pigments), etc. The amount of the optional additive that may be in the thermoplastic resin composition of the invention is not specifically defined, provided that it does not interfere with the properties of the composition.

The method for producing the thermoplastic resin composition of the invention is described. The composition may be produced by mixing and kneading the components (A) to (C) in a predetermined ratio as above, optionally along with the optional components (D) to (H) and with additives as above in any desired ratio. Formulating and mixing them may be effected in any known manner, for example, by pre-mixing them in an ordinary device, such as a ribbon blender, a drum tumbler or the like, followed by further kneading the resulting pre-mix in a Henschel mixer, a Banbury mixer, a single-screw extruder, a double-screw extruder, a multi-screw extruder, a cokneader or the like. The temperature at which the components are mixed and kneaded generally falls between 240 and 300° C. Other components than the polycarbonate resin and the styrenic resin may be previously mixed with the polycarbonate or styrenic resin or with any other thermoplastic resin to prepare a master batch, and it may be added to the other constituent components.

Having been prepared in the manner noted above, the thermoplastic resin composition of the invention may be molded into various moldings in the melt-molding devices as above, or, after it is pelletized, the resulting pellets maybe molded into various moldings through injection molding, injection compression molding, extrusion molding, blow molding, press molding, vacuum molding of foaming. Preferably, the composition is pelletized in the melt-kneading manner as above, and the resulting pellets are molded into moldings through injection molding or injection compression molding. The composition of the invention is especially favorable to such injection molding or injection compression molding, as the mold releasability of the resulting moldings is good. For injection molding of the composition, preferred is a gas-introducing molding method so as to prevent shrinkage cavity around the moldings and to reduce the weight of the moldings.

Moldings of the thermoplastic resin composition of the invention as produced through injection molding or compression injection molding are usable as various housings and parts of office automation appliances, and electric and electronic appliances for household or industrial use, such as duplicators, facsimiles, televisions, radios, tape recorders, video decks, personal computers, printers, telephones, information terminals, refrigerators, microwave ovens, etc.

The invention is described in more detail with reference to the following Examples and Comparative Examples, which, however, are not intended to restrict the scope of the invention.

EXAMPLES 1 TO 7, AND COMPARATIVE EXAMPLES 1 TO 8:

The components shown in Table 1 below were blended in the ratio indicated therein (the components (A) and (B) are in terms of % by weight, and the other components are in terms of parts by weight relative to 100 parts by weight of the total of (A) and (B)), fed into an extruder (VS40 from Tanabe Plastic Machinery), melted and kneaded therein at 260° C., and then pelletized. To all compositions of Examples and Comparative Examples, added were 0.2 parts by weight of Irganox 1076 (from Ciba-Geigy) and 0.1 parts by weight of Adekastab C (from Asahi Denka Industry) serving as, both serving as an antioxidant. The resulting pellets were dried at 80° C. for 12 hours, and then molded into test pieces through injection molding at 260° C. These test pieces were tested for their properties, and their data obtained are shown in Table 1. Apart from those, the pellets were molded in a releasability testing mold to produce box samples having a size of. 80 mm×100 mm×40 mm (depth) and a wall thickness of 3 mm, at a draft of 0 (zero) under the same condition as above. The releasability of the samples from the mold was checked, and shown in Table 1.

The materials used for producing the test samples, and the methods for testing the samples are mentioned below.

(A) Polycarbonate: Toughlon A1900 (from Idemitsu Petrochemical).

This is a bisphenol A polycarbonate resin having a melt index (MI) of 20 g/10 min (at 280° C., under a load of 2.16 kg), and a viscosity-average molecular weight of 19000.

(B) Styrenic resin (impact-resistant polystyrene resin, HIPS): Idemitsu PS HT44 (from Idemitsu Petrochemical).

This is a polystyrene-grafted polybutadiene (rubber-like elastomer) of which the rubber-like elastomer content is 7% by weight, and this has MI of 8 g/10 min (at 200° C., under a load of 5 kg).

(C) Mold release agent:

C1: Pentaerythritol Tetrastearate

C2: Glycerin monostearate

C3: Bees wax

C4: Polyethylene wax. This is the same as (D).

(D) Polyethylene wax: Mitsui Hiwax 400P (from Mitsui Chemical), having a molecular weight of 4000.

(E) Rubber-like elastomer (core/shell-type, grafted rubber-like elastomer): Metablen S2001 (from Mitsubishi Rayon).

This is a composite rubber-grafted copolymer having a polydimethylsiloxane content of at least 50% by weight.

(F) Flame retardant (halogen-free phosphate): PFR (from Daihachi Chemical Industry).

This is resorcinol-bis(diphenol phosphate).

(G) Fluoro-olefinic resin: F210L (from Daikin Chemical Industry).

This is polytetrafluoroethylene having a molecular weight of from 4,000,000 to 5,000,000.

(H) Talc: FFR (from Asada Flour Milling), having a mean grain size of 0.7 $\mu$m.

Testing Methods:

(1) Izod Impact Strength:

Measured according to ASTM D256. The temperature was 23° C., and the thickness of samples was ⅛ inches. The data are in terms of kJ/m$^2$.

(2) Flexural Modulus:

Measured according to ASTM D790. The temperature was 23° C., and the thickness of the samples was 4 mm. The data are in terms of MPa.

(3) SFL (spiral flow length):

Measured according to an Idemitsu method. The molding resin temperature was 240° C., and the mold temperature was 60° C. Resin samples were molded into sheets having a thickness of 3 mm and a width of 10 mm under an injection pressure of 110 MPa. The data of SFL are in terms of cm.

(4) Mold Releasability:

The pressure applied to the ejector pin was measured. The pressure was at most up to 30 kg/cm$^2$. Smaller pressure measured indicates better mold releasability. The outward appearance of the molding samples was visually checked, and shown in Table 1. Samples with no ejector pin mark were judged good.

(5) Flame Retardancy:

Tested according to. the UL94 combustion test. Samples tested had a thickness of 1.5 mm.

TABLE 1

|  | Ex. 1 | Ex. 2 | Ex. 3 | Ex. 4 | Ex. 5 | Ex. 6 | Ex. 7 | Comp. Ex. 1 | Comp. Ex. 2 | Comp. Ex. 3 | Comp. Ex. 4 | Comp. Ex. 5 | Comp. Ex. 6 | Comp. Ex. 7 | Comp. Ex. 8 |
|---|---|---|---|---|---|---|---|---|---|---|---|---|---|---|---|
| Composition |  |  |  |  |  |  |  |  |  |  |  |  |  |  |  |
| (A) PC | 80 | 70 | 80 | 80 | 90 | 80 | 90 | 80 | 80 | 80 | 80 | 80 | 80 | 80 | 80 |
| (B) PS | 20 | 30 | 20 | 20 | 10 | 20 | 10 | 20 | 20 | 20 | 20 | 20 | 20 | 20 | 20 |
| (C) Mold release agent | C1:1 | C1:1 | C1:1 | C1:1 | C1:1 | C1:1 | C1:2 | — | C2:1 | C3:1 | C4:1 | — | — | C1:1 | C1:1 |

TABLE 1-continued

| | Ex. 1 | Ex. 2 | Ex. 3 | Ex. 4 | Ex. 5 | Ex. 6 | Ex. 7 | Comp. Ex. 1 | Comp. Ex. 2 | Comp. Ex. 3 | Comp. Ex. 4 | Comp. Ex. 5 | Comp. Ex. 6 | Comp. Ex. 7 | Comp. Ex. 8 |
|---|---|---|---|---|---|---|---|---|---|---|---|---|---|---|---|
| (D) PO wax | — | 1 | 1 | — | — | — | — | — | — | — | — | — | 1 | — | 1 |
| (E) Rubber-like elastomer | 5 | 5 | 5 | 5 | 5 | 5 | 5 | 5 | 5 | 5 | 5 | — | — | — | — |
| (F) Flame retardant | — | — | 8 | 8 | 5 | 8 | 5 | 8 | 8 | 8 | 8 | — | — | — | — |
| (G) PTFE | — | — | — | 0.2 | 0.2 | 0.2 | 0.2 | 0.2 | 0.2 | 0.2 | 0.2 | — | — | — | — |
| (H) Talc | — | — | — | — | — | 10 | 10 | 10 | 10 | 10 | 10 | — | — | — | — |
| Test Data | | | | | | | | | | | | | | | |
| (1) Izod (kJ/m$^2$) | 70 | 70 | 65 | 65 | 75 | 40 | 45 | 30 | 15 | 20 | 30 | 45 | 45 | 50 | 53 |
| (2) Flexural modulus (MPa) | 2300 | 2300 | 2450 | 2450 | 2350 | 3600 | 3550 | 3000 | 3600 | 3600 | 3500 | 2450 | 2400 | 2450 | 2400 |
| (3) SFL (cm) | 60 | 62 | 80 | 80 | 72 | 72 | 68 | 64 | 70 | 66 | 60 | 40 | 42 | 52 | 55 |
| (4) Mold releasability Pressure (kg/cm$^2$) | 18 | 14 | 12 | 12 | 16 | 18 | 19 | not released | 18 | 19 | 18 | not released | 20 | 18 | 15 |
| Outward appearance | good | good | good | good | good | good | good | — | with pin marks | with pin marks | with pin marks | — | with pin marks | good | good |
| (5) Flame retardancy | — | — | V-2 | V-0 | V-0 | V-0 | V-0 | V-0 | V-1 | V-0 | V-0 | — | — | — | — |

As in Table 1, it is obvious that the moldings of the thermoplastic resin compositions of Examples 1 to 7 of the invention and Comparative Examples 7 and 8 all have good mold releasability. As opposed to those, the mold releasability of the moldings of Comparative Examples 1 to 4 is poor. Depending on their shape and size, the comparative moldings are difficult to produce or take a lot of time for cooling the mold, and the productivity of the comparative moldings is low. As in Comparative Example 8 and Example 2, adding the polyolefin wax to the compositions improves the mold releasability of the moldings. The compositions of Examples 4 to 7 all have good fluidity, and their moldings have good mechanical strength and good mold releasability, while having good flame retardancy as indicated by V-0. As in Examples 6 and 7, adding talc to the compositions increases the rigidity of the moldings. In addition, as compared with that of the comparative samples not containing a mold release agent or containing a mold release agent not within the scope of the invention, the impact strength of the samples of Examples 6 and 7 is significantly increased. The moldings of Comparative Examples 2 to 4 have ejector pin marks, though the mold-releasing pressure thereto is not so high. Therefore, these are not practicable.

According to the invention, selectively adding specific additives to a resin mixture of a polycarbonate resin (PC) and a styrenic resin (PS) enables smooth injection molding of the resulting resin composition to give complicated and thin-walled moldings. The moldings of the composition have good mold releasability, and their productivity is high. Further adding a flame retardant, especially a halogen-free phosphate and also a fluoro-olefinic resin to the composition makes the molding of the composition have good flame retardancy, without interfering with the moldability of the composition and with the physical properties of the moldings of the composition. Adding a rubber-like elastomeric polymer and an inorganic filler to the composition is preferred, as further improving the impact resistance, the rigidity, the heat resistance and the flame retardancy of the moldings of the composition. In particular, even though the composition contains talc to give rigid moldings, the impact strength of the moldings is significantly increased. The moldings of the invention containing a halogen-free phosphate that serves as a flame retardant are preferred, as not polluting the environment.

While the invention has been described in detail and with reference to specific embodiments thereof, it will be apparent to one skilled in the art that various changes and modifications can be made therein without departing from the spirit and scope thereof.

What is claimed is:

1. A thermoplastic resin composition, comprising:
   100 parts by weight of a resin mixture of (A) from 30 to 99% by weight of a polycarbonate resin and (B) from 1 to 70% by weight of a styrenic resin;
   from 0.1 to 5 parts by weight of (C) an ester of pentaerythritol and a saturated aliphatic carboxylic acid;
   from 0.1 to 5 parts by weight, relative to 100 parts by weight of the resin mixture, of (D) a polyolefin wax; and
   from 1 to 30 parts by weight, relative to 100 parts by weight of the resin mixture, of (E) a core/shell-type, grafted rubber-like elastomer;
   wherein the core/shell-type, grafted rubber-like elastomer is obtained by polymerization of one or more vinylic monomers in the presence of a rubber-like polymer obtained from a monomer mixture comprising alkyl (meth)acrylates and dimethylsiloxane.

2. The thermoplastic resin composition as claimed in claim 1, further comprising from 1 to 50 parts by weight, relative to 100 parts by weight of the resin mixture, of (F) a flame retardant.

3. The thermoplastic resin composition as claimed in claim 2, wherein the flame retardant is a halogen-free phosphate.

4. The thermoplastic resin composition as claimed in claim 3, further comprising from 0.05 to 5 parts by weight, relative to 100 parts by weight of the resin mixture, of (G) a fluoro-olefinic resin.

5. The thermoplastic resin composition as claimed in claim 4, wherein the fluoro-olefinic resin has the ability to form fibrils.

6. The thermoplastic resin composition as claimed in claim 1, further comprising from 1 to 50 parts by weight, relative to 100 parts by weight of the resin mixture, of (H) an inorganic filler.

7. An injection molding of the thermoplastic resin composition of claim 1.

8. The injection molding as claimed in claim 7, which is in the form of a housing or part, wherein the housing or part is of an office automation appliance, or an electric or electronic appliance for household use or industrial use.

9. The thermoplastic resin composition as claimed in claim 1, wherein in the rubber-like polymer is a composite rubber.

10. The thermoplastic resin composition as claimed in claim 9, wherein the composite rubber comprises from 5 to 95% by weight of a polysiloxane component and from 5 to 95% by weight of a polyacryl(meth)acrylate rubber component.

11. The thermo plastic resin composition according to claim 1, wherein said saturated aliphatic carboxylic acid has 14–26 carbon atoms.

* * * * *